May 1, 1945.  S. H. WILLIAMS  2,374,795

LOOM WEAVER'S IMPLEMENT

Filed Aug. 2, 1943

Sharon H. Williams
INVENTOR

BY Victor J. Evans & Co.
ATTORNEY

Patented May 1, 1945

2,374,795

UNITED STATES PATENT OFFICE 2,374,795

LOOM WEAVER'S IMPLEMENT

Sharon H. Williams, Lindale, Ga.

Application August 2, 1943, Serial No. 497,084

1 Claim. (Cl. 287—99)

This invention relates to loom weaver's implements, and its general object is to provide a single implement that can be conveniently carried by a loom worker or weaver for use in cutting loose ends of threads and for drawing loose ends through the harness or heddle eyes, the comb teeth and the reed of the loom, thus eliminating the present practice of the weaver carrying several implements for the purpose set forth, namely a knife or shears and a reed hook, as my implement is capable of performing all of the functions of the separate implements named and in an easy and expeditious manner.

A further object is to provide an implement of the character set forth, that includes shears and a reed hook associated with each other in a manner whereby either can be used with utmost convenience and without interference from the other.

Another object is to provide an implement that is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which.

Figure 1:
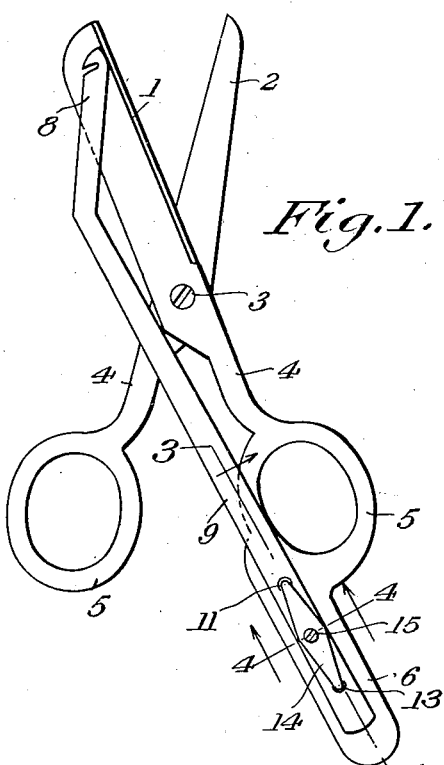
Figure 1 is a top plan view of the implement which forms the subject matter of the present invention, with the shears or scissors in open position and the reed hook disposed to closed position or out of use.

Referring to the drawing in detail, it will be noted that the shears include companion blades 1 and 2 respectively, that are pivoted together as at 3, and formed on the shanks 4 of the blades are handles 5 formed to provide thumb and finger receiving eyes. The blade 1 is of greater width than that of the blade 2 to provide a broad bearing surface for receiving the reed hook when the latter is in its normal position or out of use, as shown in Figure 1, so that the hook will in no way interfere with the use of the shears.

Formed on and extending outwardly and from adjacent the inner side of the finger or thumb receiving eye of the wide blade 1, for disposal approximately in alignment with that blade, is a flat elongated extension or tongue 6 that is provided with a transversely rounded groove 7 along the longitudinal center thereof for a portion of its length, and the tongue acts as a support for the reed hook, the latter being relatively narrow and flat throughout its length and being slightly tapered inwardly from end to end toward its hooked end 8. The hooked end portion of the reed hook is bent at a slight angle to the shank 9 thereof, and said portion is notched as at 10 in the usual manner.

Figure 2:
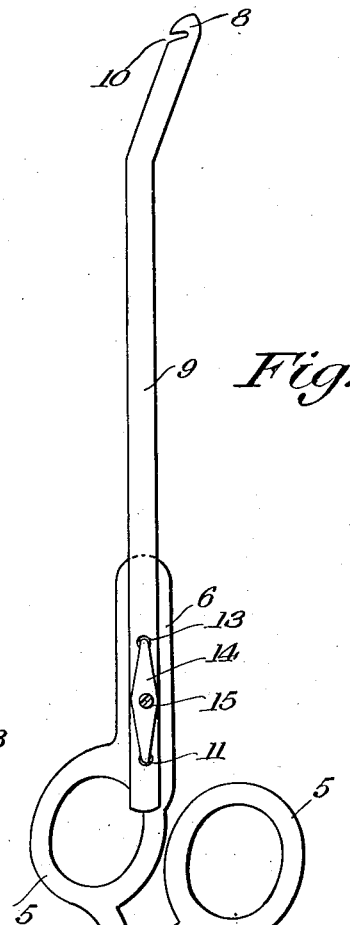
Figure 2 is a similar view with the reed hook arranged in a position for use.
Figure 3:
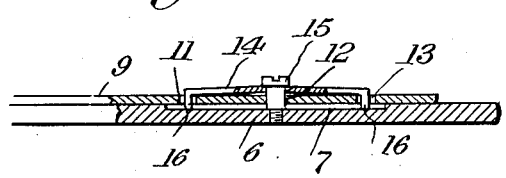
Figure 3 is a sectional view taken approximately on line 3—3 of Figure 1, looking in the direction of the arrows.
Figure 4:
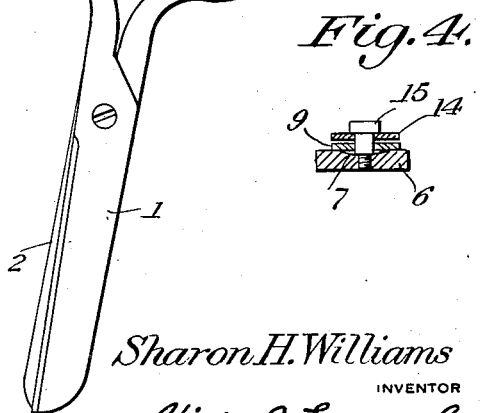
Figure 4 is a sectional view taken approximately on line 4—4 of Figure 1, looking in the direction of the arrows.

The shank 9 is provided with a longitudinal row of three equidistantly spaced holes 11, 12 and 13 respectively, that are disposed adjacent to the end of the shank opposite the hooked end portion for use with suitable means together with the groove 7 for securing the reed hook to the tongue 6 against casual removal from either of its positions of Figures 1 and 2, but allowing free manual movement of the reed hook to said positions. For that purpose I provide a leaf spring 14 that is tapered inwardly from its transverse center to its ends, and which has a hole through its transverse center for receiving the unthreaded portion of a shouldered screw 15 that is threaded in the tongue 6 midway the ends of the groove 7, the latter providing a seat for receiving the rounded downturned ends 16 of the leaf spring, as clearly shown in Figures 3 and 4. The unthreaded portion of the screw extends through the central hole 12 of the shank to allow rotation of the reed hook about the same, and the rounded downturned ends 16 extend through the end holes 11 and 13 to be seated in the groove, as best shown in Figure 3.

From the above description and disclosure in the drawing, it will be obvious that the shears are to be used when the reed hook is disposed to its so-called closed position of Figure 1, and when it is desired to use the reed hook, it is moved to its open position of Figure 2. Due to the arrangement of the reed hook relative to the blades, the latter provide a convenient handle therefor, as will be apparent from Figure 2.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

In a device of the class described, elongated members one foldable upon the other, a screw threaded into one of said members and having the other member rotatably mounted thereon for disposal in extended relation to said one member, said one member having a longitudinally extending groove therein, a leaf spring mounted on the screw and carried by said other member, said spring having downturned ends extending through openings formed in said other member to engage in said groove to hold the members in their overlapped or extended positions of use.

SHARON H. WILLIAMS.